Patented Sept. 18, 1951

2,568,583

UNITED STATES PATENT OFFICE 2,568,583

METHOD OF SEPARATING IMPURITIES FROM USED LUBRICATING OILS

Eldon F. Graves, Midland, Mich., assignor to The Dow Chemical Company, Midland, Mich., a corporation of Delaware No Drawing. Application June 18, 1949, Serial No. 100,082

10 Claims. (Cl. 196—16)

This invention concerns a method of reclaiming used lubricating oils. It relates more particularly to a method of separating dispersed impurities from used lubricating oils.

Hydrocarbon oils suitable as lubricants for internal combustion engines frequently contain additives which serve as dispersants so that polymeric materials formed therein during use, and accumulated impurities such as carbon, gums, metallic salts, dust, etc., remain dispersed in the oil rather than settling as a sludge in the machine. Such oils, when obtained in a form free of an added dispersing agent may after use readily be recovered by permitting them to stand so that the tarry materials, e. g. polymers, oxidation products, gums, etc., and other foreign materials such as carbon, or metal particles, settle as a sludge, and then decanting and filtering the supernatant oil. However, such used oil comprising a dispersing agent cannot be recovered in such manner. The impurities remain dispersed throughout the oil over a long period of time and the oil itself cannot satisfactorily be filtered to remove the solid impurities dispersed therein. Instead, filtration of such oil usually results in passage of the impurities through the filter together with the oil.

It is known that solid impurities such as finely divided carbon, soot, or metallic salts, etc., which become dispersed in lubricating oil on use, may be precipitated by mixing with the oil as a coagulant a small amount, i. e. from 0.1 to 1 per cent by weight of a pentanol-amine mixture, or a small amount of nor.-butyl diethanolamine. This latter compound has been used in analytical procedures on such lubricating oils. However, these amino compounds are costly so that the use of such compounds in processes for reclaiming used lubricating oils is uneconomical.

It is an object of the invention to provide a process for reclaiming used lubricating oil which process involves aggregating the dispersed impurities with a relatively inexpensive and readily available coagulant material and subsequently separating the aggregate of impurities from the oil. Another object is to separate dispersed solid impurities from a used lubricating oil containing a detergent. A further object is to recover used lubricating oil containing dispersed impurities by procedure which involves dissolving in the oil an N-phenyl alkylol amine capable of causing the dispersed impurities to flocculate and thereafter separating the aggregate of impurities. Other and related objects will be apparent from the following description of the invention.

According to the invention, a used lubricating oil containing impurities such as carbon, soot, metallic salts, dust, gums, polymeric products, acids, or metal particles, etc., dispersed therein, may be reclaimed and the oil recovered in purified form by mixing with the oil a minor but effective proportion of an N-phenyl alkylol amine, e. g. N-phenyl diethanolamine, sufficient to cause the impurities to flocculate and thereafter separating the aggregate of impurities from the oil by settling, or by other usual manner, e. g. by filtering or by centrifuging.

The N-phenyl alkylol amines to be used in the process should contain at least one hydroxy ethyl radical attached to the nitrogen atom in the molecule. They are all members of a group consisting of N-phenyl ethanolamine, N-phenyl diethanolamine and N-phenyl ethanol-isopropanolamine. The compounds are herein referred to as N-phenyl alkylol amines.

It is important that the N-phenyl alkylol amine be dissolved in the oil in order to be effective as a coagulant for the dispersed impurities. In some instances, the N-phenyl alkylol amine may not be soluble in the oil to be reclaimed, or it may be ineffective as a coagulant for the dispersed impurities, depending in part upon the processing treatment during refining of the crude oil and also upon the additives such as detergents, oxidation inhibitors, etc., which may be incorporated in the refined lubricating oil. In general, the process is applicable for reclaiming used light and heavy duty lubricating oils from internal combustion engines, e. g. diesel motors or gasoline motors. However, prior to treating a large quantity of a used lubricating oil with the N-phenyl alkylol amine, a simple test should be made to determine the solubility of the N-phenyl alkylol amine in the oil and its effect as a coagulant for the dispersed impurities.

The proportion of the N-phenyl alkylol amine to be employed may vary depending upon the amount of impurities dispersed in the oil. I usually employ an amount of the N-phenyl alkylol amine corresponding to from 0.1 to 2, preferably from 0.2 to 1.0, per cent by weight of the oil, although larger amounts of the N-phenyl alkylol amine may be used.

The N-phenyl alkylol amine, e.g. N-phenyl diethanol-amine, may be mixed with the oil at room temperature, but it is usually dissolved in the oil while the latter is at a temperature above the melting point of the N-phenyl diethanolamine, i.e. at a temperature of 55° C., or higher. In practice, the used oil is preferably heated to a temperature between 220° and 300° F., to vaporize low boiling ingredients together with dissolved moisture, which materials are separated from the oil. Thereafter, the N-phenyl alkylol amine and the oil are mixed together in the desired proportions, and the mixture is stirred for a brief period to dissovle the N-phenyl alkylol amine in the oil. The mixture is then allowed to stand for a time sufficient to flocculate the impurities, or for a longer time to allow the aggregate of impurities to separate from the oil by settling. In general, flocculation of the impurities usually occurs in from 15 to 30 minutes after dissolving the N-phenyl alkylol amine in the oil, although separation of the aggregate of impurities by settling may require a time of from 1 to 15 days, or longer. However, the solid impurities, after aggregation of the same by the addition of the N-phenyl alkylol amine to the oil, may be separated from the mixture and the oil recovered, by other usual manner such as by centrifuging or by filtering.

Separation of the aggregate of solid impurities is usually carried out at room temperature, or thereabout, by settling, but may advantageously be carried out by heating the mixture of the oil and the N-phenyl alkylol amine at temperatures between 125° and 200° F., and thereafter separating the aggregate of impurities by filtering, or by centrifugal separation in a clarifier bowl. When the aggregate of impurities is separated from the oil by sedimentation, i. e. by settling of the aggregate of solid impurities and decanting of the supernatant oil layer, the recovered oil is preferably filtered and is then suitable for re-use as a general machine oil.

The following examples illustrate a way in which the principle of the invention has been applied, but are not to be construed as limiting the invention.

*Example 1*

A charge of 650 grams of used diesel lubricating oil, containing dispersed carbon and other impurities, was heated to a temperature of 240° F., and 4 grams of N-phenyl diethanolamine added thereto with stirring. The mixture was then poured into a 2 inch diameter by 20 inches long glass test tube and allowed to stand at room temperature. After standing for 16 hours a sludge had settled to the bottom of the tube forming a layer 1.25 inches deep, leaving an upper bright oil layer which was readily decanted from the sludge. By contrast, a similar tube of the untreated used oil showed no separation of the impurities after standing for 5 months

*Example 2*

A charge of 1600 pounds of used Diesel lubricating oil was placed in an open vessel equipped with a heating coil and stirrer. The oil was stirred and heated to temperatures of from 220° to 230° F. over a period of 30 minutes. Thereafter the heat was turned off and 8 pounds of N-phenyl diethanolamine was added to the oil and the mixture stirred for 15 minutes longer. The mixture was then run off into drums and allowed to stand over a period of two weeks. The supernatant oil layer was then siphoned off, heated to a temperature of 165° F. and filtered. There was obtained 1520 pounds of bright oil.

*Example 3*

A mixture consisting of 200 grams of used Diesel lubricating oil and 1 gram of N-phenyl ethanol-isopropanolamine was heated to a temperature of 230° F., with stirring. Thereafter the mixture was poured into a test tube and allowed to stand at room temperature. After standing for 48 hours a sludge had settled to the bottom of the tube forming a layer 3 inches deep, leaving an upper bright oil layer.

*Example 4*

In a series of three experiments separate mixtures, each consisting of 200 grams of used Diesel lubricating oil and 1 gram of N-phenyl ethanolamine, were heated to a temperature of 230° F., with stirring. Thereafter, the mixtures were poured into test tubes and the mixtures maintained at a temperature of 78° F., 212° F., and 302° F., respectively. After standing at the respective temperatures for a period of 24 hours, a sludge had settled to the bottom of each of the tubes, forming a layer about 1.5 inches deep, leaving an upper bright oil layer which was readily decanted.

Other modes of applying the principle of the invention may be employed instead of those explained, change being made as regards the steps or compounds herein employed, provided the steps or compounds or the equivalent of such steps or compounds stated in any of the following claims be employed.

I claim:

1. A method of separating dispersed impurities from used lubricating oil which comprises, dissolving in the oil a minor but effective proportion of an N-phenyl alkylol amine selected from the group consisting of N-phenyl ethanolamine, N-phenyl diethanolamine, and N-phenyl ethanol-isopropanolamine sufficient to cause aggregation of the impurities and thereafter separating the aggregate of impurities from the oil.

2. A method of separating dispersed impurities from used lubricating oil which comprises, dissolving in the oil from 0.2 to 1 per cent by weight of an N-phenyl alkylol amine selected from the group consisting of N-phenyl ethanolamine, N-phenyl diethanolamine and N-phenyl ethanolamine-isopropanolamine to cause aggregation of the impurities and thereafter separating the aggregate of impurities from the oil.

3. A method of separating dispersed impurities from used lubricating oil as described in claim 2, wherein the N-phenyl alkylol amine is N-phenyl ethanolamine.

4. A method of separating dispersed impurities from used lubricating oil as described in claim 2, wherein the N-phenyl alkylol amine is N-phenyl diethanolamine.

5. A method of separating dispersed impurities from used lubricating oil as described in claim 2, wherein the N-phenyl alkylol amine is N-phenyl ethanol-isopropanolamine.

6. A method of separating dispersed impurities from used lubricating oil which comprises, dissolving in the oil from 0.2 to 1 per cent by weight of N-phenyl diethanolamine to cause aggregation of the impurities and thereafter separating the aggregate of impurities from the oil by filtering, said filtering operation being carried out while the oil is at temperatures between 125° and 200° F.

7. A method of separating dispersed impurities from used lubricating oil which comprises, dissolving in the oil from 0.2 to 1 per cent by weight of N-phenyl diethanolamine to cause aggregation of the impurities, heating the mixture to temperatures between 125° and 200° F. and thereafter separating the aggregate of impurities from the oil by centrifuging.

8. A method of separating dispersed impurities from used lubricating oil which comprises, heating the oil at temperatures between 220° and 300° F., thereafter dissolving in the oil from 0.2 to 1 per cent by weight of N-phenyl diethanolamine to cause aggregation of the impurities and separating the aggregate of impurities from the oil.

9. A method of separating dispersed impurities from used diesel lubricating oil which comprises, heating the oil at temperatures between 220° and 300° F., thereafter dissolving in the oil from 0.2 to 1 per cent by weight of N-phenyl diethanolamine to cause aggregation of the impurities, separating the aggregate of impurities from the oil by settling and filtering the supernatant oil.

10. A method of separating dispersed impurities from used diesel lubricating oil as described in claim 9, wherein from 0.2 to 1 per cent by weight of N-phenyl ethanolamine is dissolved in the oil to cause aggregation of the impurities.

ELDON F. GRAVES.

REFERENCES CITED

The following references are of record in the file of this patent:

UNITED STATES PATENTS

| Number | Name | Date |
|---|---|---|
| 1,882,002 | Dietrich | Oct. 11, 1932 |
| 2,162,195 | Greensfelder et al. | June 13, 1939 |